United States Patent
Bousquet

[11] Patent Number: 5,867,392
[45] Date of Patent: *Feb. 2, 1999

[54] METHOD FOR MARKING OR CUTTING A MATERIAL ALONG PREDETERMINED PATHS

[75] Inventor: Philippe Bousquet, Merignac, France

[73] Assignee: Lectra Systemes, Cestas, France

[ * ] Notice: This patent issued on a continued prosecution application filed under 37 CFR 1.53(d), and is subject to the twenty year patent term provisions of 35 U.S.C. 154(a)(2).

[21] Appl. No.: 581,504

[22] PCT Filed: Jul. 8, 1994

[86] PCT No.: PCT/FR94/00849

§ 371 Date: Jan. 11, 1996

§ 102(e) Date: Jan. 11, 1996

[87] PCT Pub. No.: WO95/02489

PCT Pub. Date: Jan. 26, 1995

[30] Foreign Application Priority Data

Jul. 15, 1993 [FR] France .................. 93 08698

[51] Int. Cl.[6] .................................................. G06F 19/00
[52] U.S. Cl. ................. 364/474.09; 364/470.05; 364/474.15; 364/474.26
[58] Field of Search .............. 364/470.01, 470.02, 364/470.04, 470.05, 470.06, 470.08, 470.09, 468.18, 468.21, 468.28, 474.03, 474.09, 474.13, 474.14, 474.15, 474.22, 474.23, 474.24, 474.25, 474.26, 474.34

[56] References Cited

U.S. PATENT DOCUMENTS

| | | | |
|---|---|---|---|
| Re. 34,294 | 6/1993 | Gerber | 33/18.1 |
| 3,614,369 | 10/1971 | Medley | 219/10.43 |
| 4,328,726 | 5/1982 | Pearl | 83/39 |
| 4,391,170 | 7/1983 | Boverman et al. | 83/71 |
| 5,172,326 | 12/1992 | Campbell et al. | 364/470 |
| 5,214,590 | 5/1993 | Schnetzer | 364/474 |
| 5,333,111 | 7/1994 | Chaiken et al. | 364/470.09 |
| 5,450,333 | 9/1995 | Minami et al. | 364/474.09 |
| 5,621,648 | 4/1997 | Crump | 364/468.19 |

FOREIGN PATENT DOCUMENTS

| | | |
|---|---|---|
| 2016554 | 5/1990 | Canada . |
| 0229953 | 7/1987 | European Pat. Off. . |
| 0 316 587 | 10/1988 | European Pat. Off. . |
| 0472190 | 2/1992 | European Pat. Off. . |
| 2640202 | 6/1990 | France . |

*Primary Examiner*—Reba I. Elmore
*Assistant Examiner*—Thomas E. Brown
*Attorney, Agent, or Firm*—Jones & Askew

[57] ABSTRACT

Each path ($P_1$–$P_{10}$) is travelled by moving a tool in two directions in a determined working zone (20) through which the material (22) is advanced intermittently under the action of a control circuit that is separate from the control circuit of the tool, without the work of the tool being totally interrupted while the material is advancing. Each time the material advances, it does so over a distance that is less than the length of the working zone, as measured in the advance direction of the material, and while the material is advancing, the tool is caused to travel along at least a portion of one or more paths ($P_6$–$P_8$) over a portion of the material that is already within the working zone prior to the advance, and that is not removed from the working zone during the advance.

12 Claims, 6 Drawing Sheets

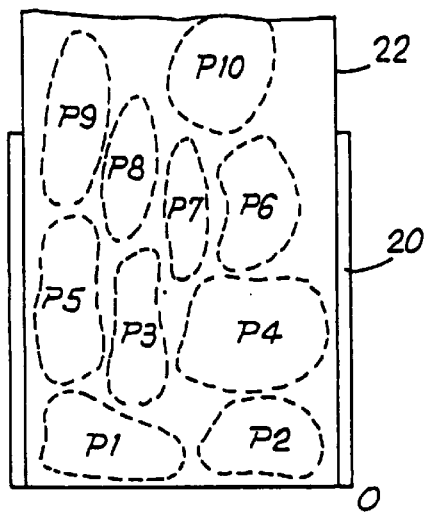
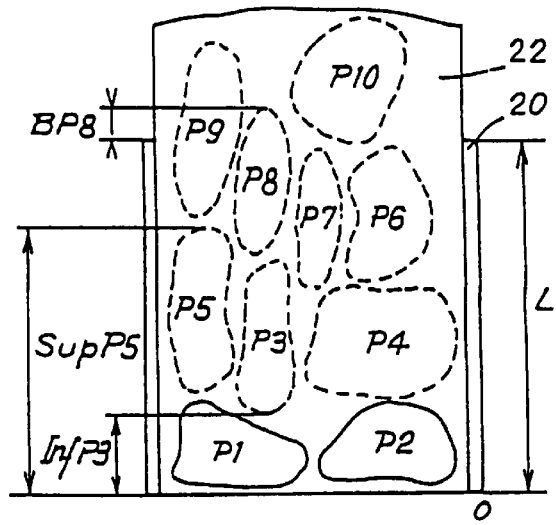
FIG. 5A  FIG. 5B
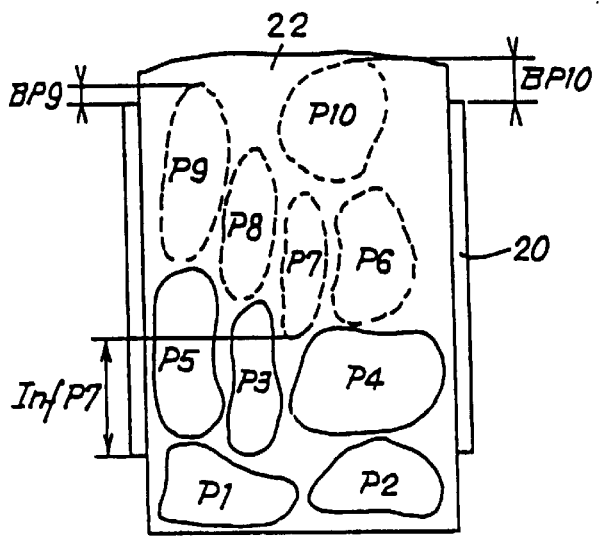
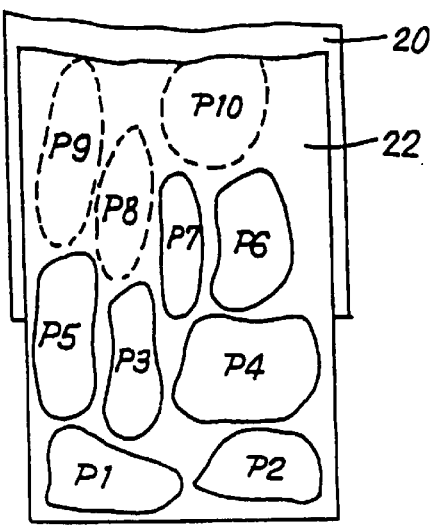
FIG. 5C  FIG. 5D

METHOD FOR MARKING OR CUTTING A MATERIAL ALONG PREDETERMINED PATHS

The present invention relates to a method of performing plotting or cutting along predetermined paths on a material.

The invention is particularly applicable to plotters and engraving or cutting machines in which plotting or cutting corresponding to predetermined drawings is performed on a material by means of relative displacement between the material and a tool, such as a writing, engraving, or cutting tool.

The invention relates more precisely to machines that include a working zone or table on which plotting, engraving or cutting is performed by displacing the tool relative to the material in two directions within the working zone successive portions of the material being fed into the working zone under the action of a control circuit that is separate from the control circuit of the tool.

This applies in particular to numerically-controlled cutting machines used for cutting fabrics, felts, leathers, or other flexible sheet materials in the clothing industry, the furniture industry, etc. In such machines, cutting may be performed for example by means of a vibrating blade, a cutting wheel, a laser beam, or a water jet under pressure carried by a cutting head which is displaced relative to the material within the working zone in two different directions. The material may be disposed in superimposed layers forming a lay-up so that cutting can be performed through a plurality of layers simultaneously.

The pieces are cut out following a predetermined layout which is defined so as to minimize wasted material. In order to limit the size of the machines, the working zone in which cutting is performed may have a length that is less than that of an entire layout while having a width that is equal to that of the material.

In order to cut out all of the pieces in a layout, it is therefore necessary to cause the sheet material to advance intermittently so as to bring new portions of the material into the working zone, with material advance being controlled separately from cutting head displacement.

The same applies to numerically-controlled plotters that print on a continuous material (paper or some other sheet material) and that include a table XY on which plotting is performed by displacing a writing tool in two different directions, which are often orthogonal, the table having a length, in the longitudinal direction of the continuous material, that is shorter than the length taken up by a drawing or a set of drawings to be reproduced.

In such known machines, the material is caused to advance after all of the required plotting or cutting-out has been performed on that portion of the material which is situated in the working zone, the tool being in the rest position during material advance. The material is caused to advance over a length substantially corresponding to the length of the working zone, so as to bring a new portion of the material into the working zone.

A drawback with such prior art machines is that productivity is lost due to the plotting or cutting-out operations being interrupted while the material advances.

In order to reduce such loss of productivity, it is possible to cause the material to advance as quickly as possible. However, this subjects the material to stresses, and with thin and flexible materials, such stresses can cause the material to slip or cause creases to form therein, thereby reducing the accuracy of plotting or cutting-out. Furthermore, since each time the material advances, it does so over the length of the working zone, it is necessary to provide an unloading zone that is of at least the same length, which poses problems of cost, of compactness, and of accessibility;

Suggestions have been made in principle to avoid loss of productivity by not interrupting the work of the tool during material advance. To this end, reference can be made to Document FR-A-2 640 202.

However, the working region of the tool is then limited to the new portions of material that are progressively brought into the working zone during advance, and the velocity component of the tool in the longitudinal direction opposite to the advance direction cannot be greater than speed of advance. Unfortunately, as indicated above, the speed of advance cannot be very high. Moreover, any plotting and cutting-out that is not completed because it does not lie entirely within the working zone must be interrupted and then resumed. A very high degree of accuracy is then necessary to ensure that the plotting and cutting-out is resumed without any offset whatsoever when high quality plotting is desired, or so as to guarantee cutting continuity. Achieving such accuracy poses practical problems, in particular with non-rigid materials.

An object of the present invention is to provide a method which avoids any loss of productivity due to interrupting the work of the tool while the material is advancing, but which does not suffer from the above-mentioned drawbacks.

This object is achieved by the fact that, according to the invention, each time the material advances it does so over a distance that is less than the length of the working zone, as measured in the advance direction of the material, and the tool is controlled while the material is advancing so as to travel along at least a portion of one or more paths over a portion of the material that is already within the working zone prior to the advance, and that is not removed from the working zone during the advance.

By means of this disposition, no restriction is imposed on the tool while the material is advancing. Thus, tool control need not differ depending on whether the material is stationary or advancing, provided that during material advance, the co-ordinate of the tool relative to the material in the advance direction is continuously corrected by calculation so as to take the displacement of the material into account. Thus, no time is wasted while the material is advancing because the material is advanced completely while plotting or cutting-out is being formed.

In an implementation of the method of the invention, a working window is defined having a predetermined length in the advance direction of the material, which length is less than the length of the working zone, and, after at least a portion of the paths lying within the window has been travelled, the working window is shifted towards the upstream end of the working zone so as to take up a position in which it covers at least each path or path portion that has not yet been travelled and that is situated further downstream, and the material is caused to advance while the working window is simultaneously displaced.

Thus, in this implementation, a floating working window is defined which has a length less than the length of the working zone, and inside which the work of the tool is confined.

For example, a working window may be chosen having a length equal to half the length of the working zone. In which case, with the working window occupying the downstream half of the working zone, all of the paths situated within the window are travelled. The working window is then shifted upstream, e.g. over its entire length, so as to occupy the upstream half of the working zone, and the material is caused to advance over a length equal to the length of the window. As soon as the material starts advancing, the tool is controlled so that it starts travelling along the paths situated within the working window, said working window being displaced simultaneously with the material so as to occupy the downstream half of the working zone again, the tool continuing to work after the advance has ended so as to travel along all of the paths situated within the window.

In order to limit the number of paths along which travel is interrupted and then resumed, it is also possible to cause the upstream shift of the working window and the simultaneous advance of the material and of the working window to be effected over a length that is less than the length of the window. In this way, two successive positions of the window overlap. When the window is in its first position, it is thus possible not to start travelling in the overlap zone along portions of paths that are situated in the upstream portion of the window, and to wait until the window is in its second position so as to travel without interruption along these paths, thereby avoiding interruption and resumption of travel.

In another implementation of the method of the invention, each advance of the material is determined so as to enable each path to be travelled without interruption from the start of one advance to the start of the following advance. Naturally, it is assumed that each path fits entirely inside the working zone. In the event that a few paths do not satisfy this prior condition, each of these paths is subdivided into a plurality of paths, each of which does fit inside the working zone.

Each time the material advances, it does so over a length not more than a first value that is equal to the distance between the downstream end of the working zone and the closest downstream end of a location for a path that has not yet been travelled.

Preferably, each time the material advances, it then does so over a length not less than a second value that is equal to the largest of the distances between the upstream end of the working zone and the upstream ends of the locations for paths that do not yet lie entirely within the working zone, said second value remaining not more than said first value. In this way, it is possible to ensure that the location of at least one new path lies entirely within the working zone.

The invention will be better understood on reading the following description given by way of non-limiting example and with reference to the accompanying drawings, in which:

FIGS. 5A to 5D are views of positions taken up in a working zone of the machine shown in FIG. 1 by a material from which pieces are to be cut out following a predetermined layout, in a second implementation of the method of the invention.

Two implementations of the invention are now described.

The first implementation is preferably for use in applications in which travel along the paths to be followed may be interrupted and then resumed, e.g. after the material has advanced, without any particular problems being encountered, whereas the second implementation is more suited to applications in which it is preferable to avoid interruption and resumption of travel along any of the paths. The first implementation is preferably applied to plotting operations, where the line being offset slightly when plotting is resumed does not constitute a drawback. The second implementation is preferably applied to cutting or engraving operations, or to plotting operations in which perfect continuity of the line is desirable.

Both implementations are applicable to numerically controlled machines in which the tool is driven along two axes X and Y over a working zone of a support for advancing or facilitating the advance of the material on which the tool is to act. The material advances in a direction that is parallel to the plane defined by the axes X and Y, but that is not necessarily parallel to one of the axes, with the advance of the material being controlled separately from the tool.

As indicated above, the operations performed on the material may be of various types: plotting, partial or total cutting, scoring, or engraving, and they may use various types of tools. In most applications, the material is in the form of a flexible or rigid sheet, strip, or plate.

Figure 1:
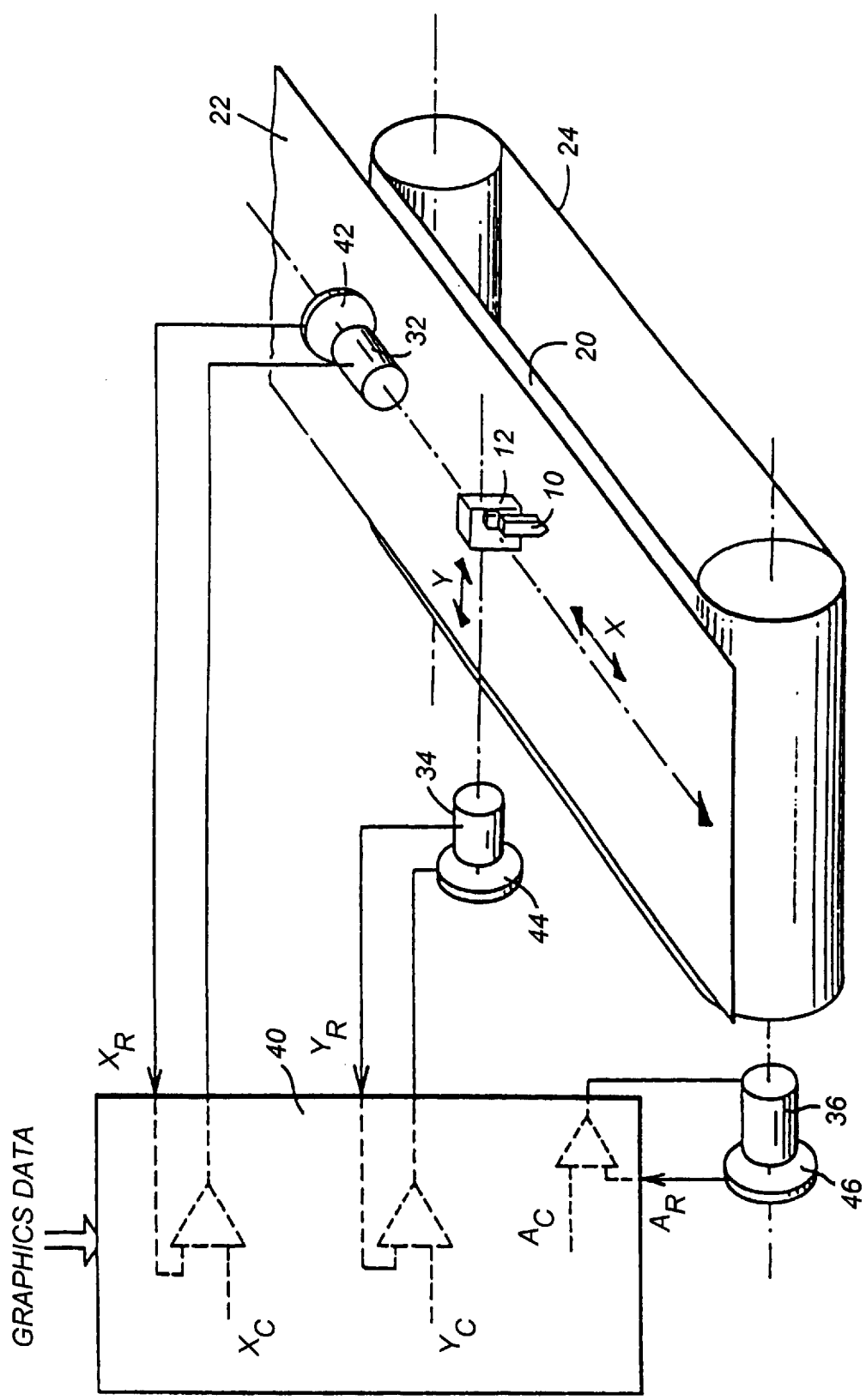
FIG. 1 is a very diagrammatic view of a cutting machine in which the method of the invention can be implemented.

FIG. 1 shows, very diagrammatically, the general design of a machine for automatically plotting outlines on a material, or for automatically cutting out pieces from a material. Such a numerically controlled machine for plotting lines on a sheet of material, or for cutting out pieces from such a material is well known, in particularly in the clothing industry.

For example, plotting or cutting is performed by means of a suitable tool 10, e.g. a felt-tip marker or a laser-beam generator carried by a head 12. The head is displaced along two orthogonal axes X and Y relative to a horizontal working zone 20 occupied by a sheet of material 22, e.g. a fabric.

The working zone 20 is constituted by the horizontal top portion of an endless conveyor 24 on which the material 22 is conveyed from an upstream feed station, and the cut-out pieces are removed from the conveyor at a downstream unloading station. The endless conveyor 24 is displaced such that it causes the material to advance intermittently into the working zone as the pieces are cut out from it. The material is moved by the conveyor merely under the effect of gravity. Additional means for securing the material to the conveyor may be provided, e.g. pressure wheels pressing against the longitudinal edges of the material.

The head 12 is displaced along X and Y (X being the longitudinal direction that is parallel to the advance direction in this example) by respective motors 32, 34 on the basis of signals supplied by a control unit 40. The unit 40 may consist of a computer. The computer 40 controls the displacement of the head 12 so as to enable the tool 10 to travel along predetermined paths, e.g., in the clothing industry, paths corresponding to a pre-established layout in the run of fabric. For this purpose, the computer 40 receives graphics data representing paths to be travelled from a memory or from a host computer. The position of the head 12 is servo-controlled to each of the axes X and Y. Real position information $X_R$ is given by a sensor, such as an angular-position encoder 42 mounted on the shaft of the motor 32, and it is compared by the computer 40 with a reference value $X_C$ so as to generate an error signal, and so as to control the motor 32. In the same way, the motor 34 is controlled as a function of an error signal obtained by comparing a reference value $Y_C$ with real position information $Y_R$ indicating the real position of the head 12 along the axis Y. The information $Y_R$ is given by an angular-position encoder 44 mounted on the shaft of the motor 34. Furthermore, for each path, the computer 40 determines the speed and the acceleration of the head 12. The computer 40 also controls a motor 36 which drives the conveyor in closed-loop motion so as to cause the material 22 to advance into the working zone 20 intermittently. An angular-position encoder 46 mounted on the shaft of the motor 36 supplies real position information $A_R$ indicating the real position of the conveyor, which information is compared with a reference value $A_C$ by the computer 40 so as to control the motor 36 such that the conveyor advances over a predetermined distance.

A general description of a first implementation of the method of the invention is given below with reference to FIGS. 2A to 2D and as applied to plotting the outlines of pieces on the material 22.

Figure 2A:
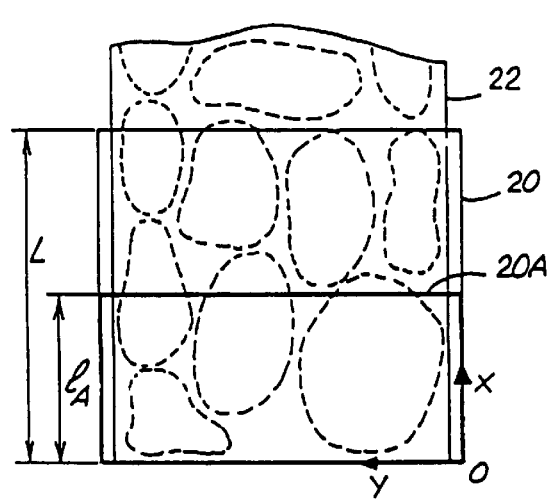
FIGS. 2A to 2D are views of positions taken up in a working zone of the machine shown in FIG. 1 by a working window and by a material from which pieces are to be cut out following a predetermined layout, in a first implementation of the method of the invention.
Figure 2B:
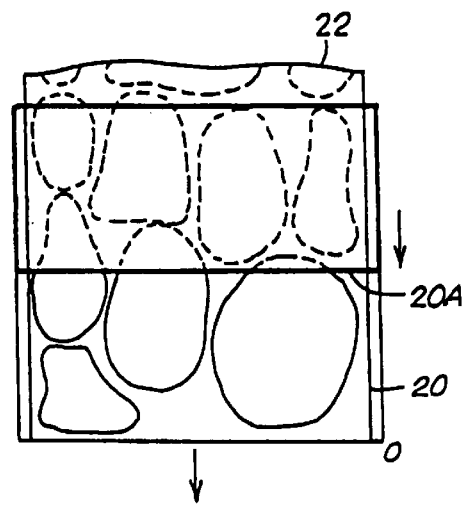

In dashed lines, FIG. 2A shows the outlines of the pieces to be plotted on the material 22 and corresponding to a pre-established layout. The working zone 20 is, in general, much shorter than the pre-established layout (which may be several meters long, or even several tens of meters long). The machine is therefore compact, but cutting out the entire layout requires the material 22 to be advanced intermittently.

The tool works within a working window 20A having a length $l_A$, in the advance direction of the material 22, that is less than the length L of the working zone 20. In the example shown, length $l_A$ is equal to L/2.

Initially, the material 22 is stationary, with its leading end situated at the downstream end of the working zone 20, and the window 20A occupies the downstream half of the working zone 20. The tool is displaced under the control of the computer so as to plot the pieces situated in the window 20A (FIG. 2B), i.e. by causing the tool to travel along the entire set of paths situated within the window.

Figure 2C:
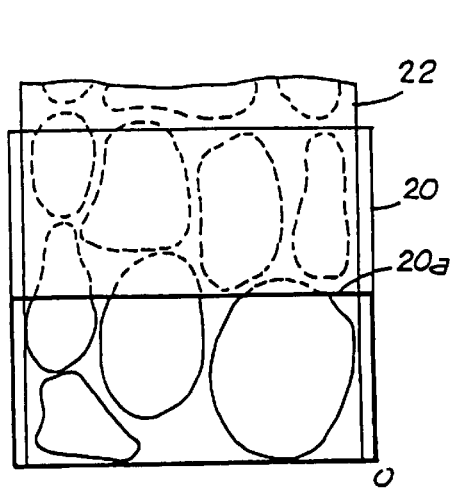

Once this initial stage has been performed, the window 20A is shifted upstream so as to occupy the upstream half of the working zone 20 (the origin of the window is positioned at the abscissa L/2), the tool is brought into the window, and the material 22 is caused to advance (FIG. 2C). During this advance, the tool is controlled by the computer so as to plot the paths situated within the window 20A which is displaced downstream in synchronization with the material. During the advance, the position of the tool is servo-controlled to reference values $X_C$+DAV, $Y_C$, where DAV is the length remaining to be travelled by the material until the end of the advance. The value DAV is deduced from the information output by the sensor 46 associated with the drive motor of the conveyor, so as to ensure that the position of the tool is servo-controlled to the position of the working window. Thus, during the advance, plotting takes place without interruption, the only modification to be made relative to plotting with the conveyor stopped consisting in continuously adjusting the abscissa reference value of the tool.

Figure 2D:
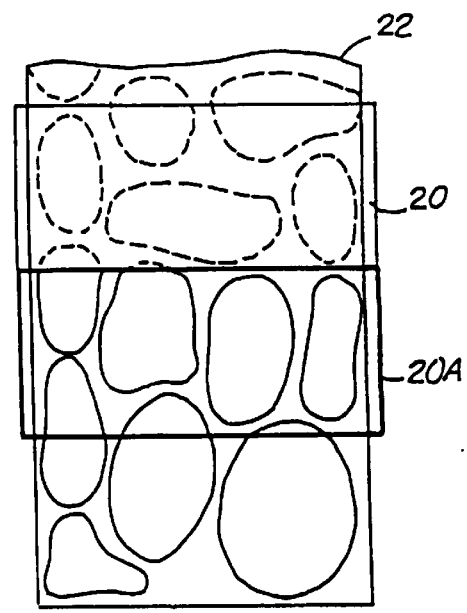

At the end of the advance, cutting-out is continued and finished in the window 20A which has returned to the downstream half of the working zone 20 (FIG. 2D).

Figure 3:
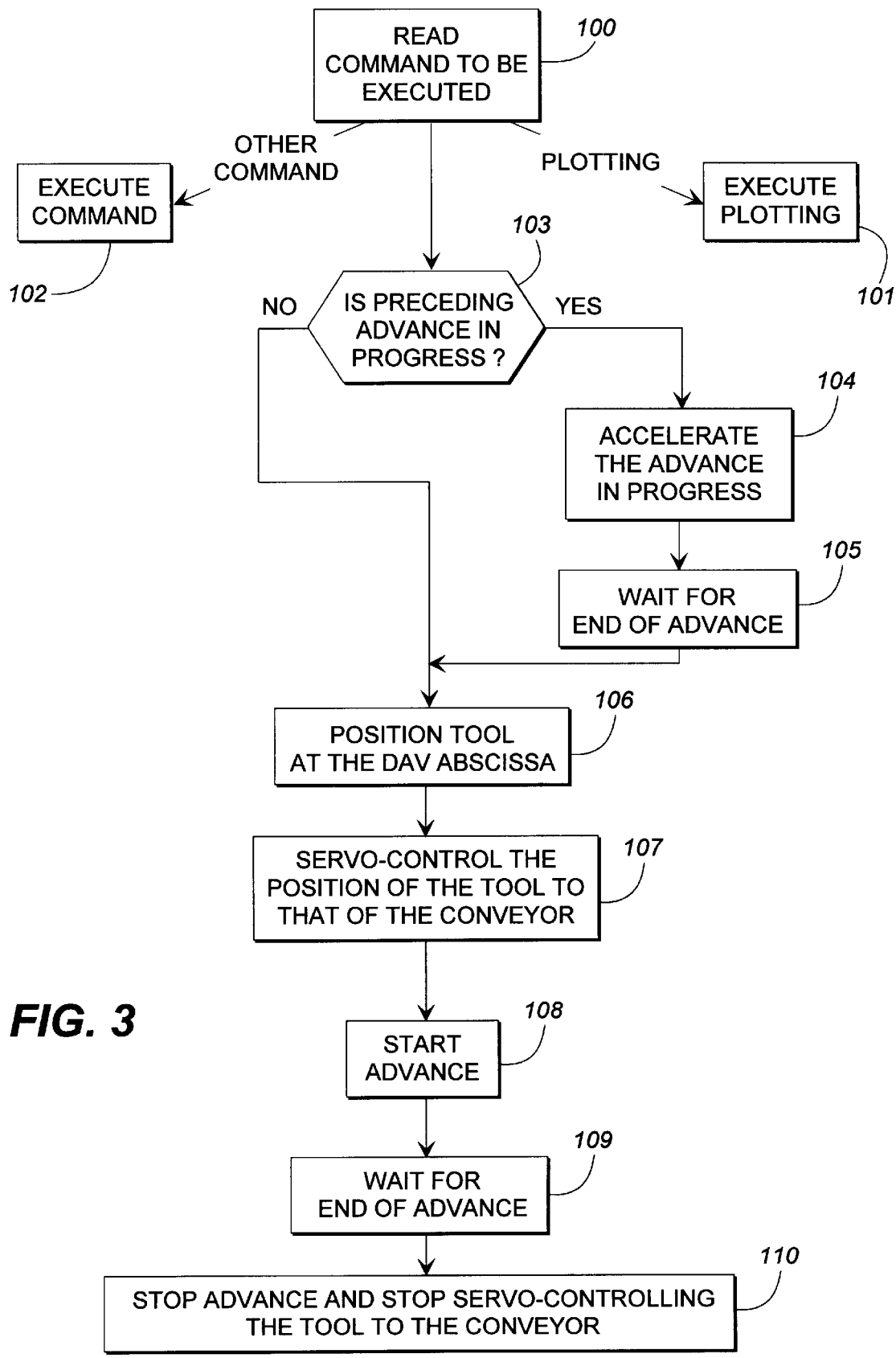
FIG. 3 is a flow chart showing the various stages of the first implementation of the method of the invention.

This processes is repeated until the entire layout has been plotted. An elementary sequence of the process is described by the algorithm shown in FIG. 3.

The various operations commanded by the computer 40 are read (stage 100). If the command is a command to execute plotting, it is executed (stage 101). The same applies if the command is a command to execute an operation other than advancing the material (phase 102), e.g. raising or lowering the writing tool.

If the command is a command to advance the material, a test is performed to check whether the preceding advance is still in progress (stage 103). If it is, the advance in progress is accelerated (stage 104), and the end of the advance is detected (stage 105).

Once the preceding advance has ended, the tool is positioned at the DAV abscissa (equal to L/2 before the start of the advance) which serves as a new origin (stage 106), i.e. the working window is displaced. The position of the tool is servo-controlled to the position of the conveyor (stage 107), and advance of the material is started (stage 108). The advance is monitored (stage 109) to detect the end thereof, and, once a length L/2 has been advanced, advance is stopped, as is servo-controlling the position of the tool to the position of the conveyor (stage 110).

Naturally, when the advance direction of the conveyor is not parallel to either of the two displacement axes of the tool, servo-controlling the position of the tool to that of the conveyor requires both reference co-ordinates of the tool to be modified.

In the above description, the length of the working window is equal to half the length of the working zone.

Figure 4A:
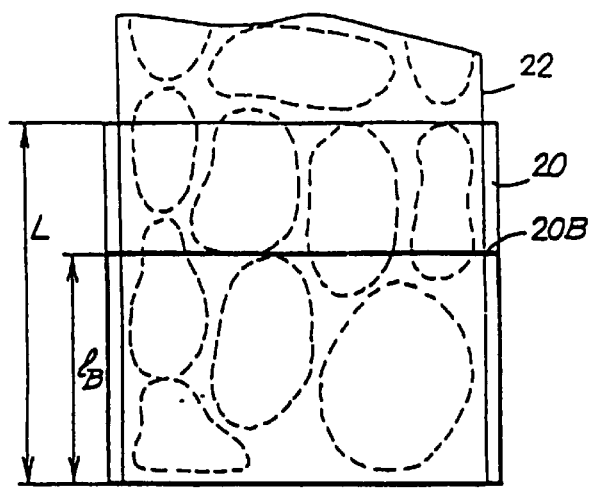
FIGS. 4A to 4C show a variant of the first implementation of the method of the invention.

In a variant, it is possible (FIG. 4A) to choose a working window 20B having a length $l_B$ that is different from L/2, e.g. that is greater than L/2.

Figure 4B:
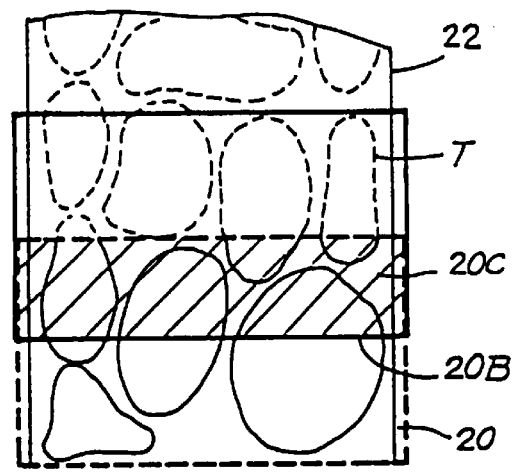

In which case, each advance must be made over a length of not more than L–$l_B$ so that, at the start of an advance (FIG. 4B), the window 20B takes up a position in which it overlaps its preceding position (shown in dashed lines in FIG. 4B).

Figure 4C:
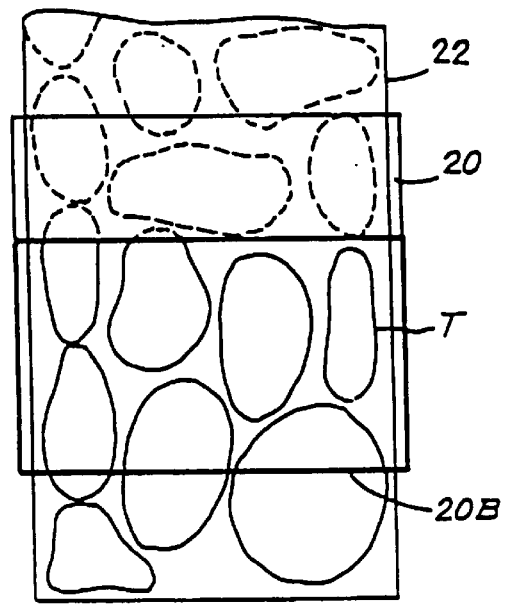

Thus, in order to avoid interrupting and then resuming travel along a path, it is possible, during a particular stage of the method (i.e. between two consecutive advances), to omit plotting the path portions that are situated in the vicinity of the upstream end of the window in the overlap zone 20C. For example, this applies to the path T. This path can then be plotted without interruption during the next stage (FIG. 4C).

The first implementation described enables the material 22 to be advanced while plotting is being performed, thereby considerably reducing any productivity loss due to the time required for advancing.

However, when a piece does not lie entirely within the window, it cannot be plotted in a single operation, except in the specific case mentioned with respect to the above-described variant.

In practice, resuming travel along a path after the material has been displaced is difficult to achieve without any offset. Although this might be acceptable for plotters, with cutters, any offset, however small, might be unacceptable because the piece in question is not fully cut-out and needs to be finished off manually.

Another implementation of the method of the invention making it possible to perform uninterrupted cutting-out, and therefore not suffering from this drawback, is described below with reference to FIGS. 5A to 5D. It is assumed that the working zone is long enough for each piece in the layout to fit within the zone, or, if a piece is longer than the working zone, it is assumed that the piece has been sub-divided into a plurality of pieces, each of which fits within the working zone.

In dashed lines, FIG. 5A shows the outlines of the pieces corresponding to the predefined layout, at the leading end of the material 22, which end has been brought into the working zone 20.

In the second implementation, a piece is cut out only if it lies entirely within the working zone after the penultimate advance. The last advance must then not be too long so that the piece is not removed from the working zone before it has been cut out.

Once the leading end of the material has been brought to the downstream end of the working zone, the piece(s) whose upstream ends are the closest to the downstream end of the working zone are cut out. In the example shown in FIG. 5B, these pieces are pieces P1 and P2.

The material can then be advanced over a length of less than InfP3, i.e. the distance, at the start of the advance, between the downstream end of the working zone and the closest downstream end of the location of a non cut-out piece (piece P3, in this example). Preferably, and if it is possible, the advance is performed over a distance of not less than the distance necessary to bring into the working zone those pieces whose locations on the material have their upstream ends closest to the downstream end of the working zone. In the example shown, this applies to piece P8 only, for which this distance BP8 is less than InfP3.

During this advance, and after the end of it, the pieces P3, P4, P5 whose locations were originally in the working zone, may be cut out (FIG. 5C). Naturally, during the advance, the position of the cutting head is servo-controlled to the position of the conveyor, as described above with respect to the first implementation.

A second advance may be commanded over a length that is less than the distance InfP7 between the downstream end of the working zone and the closest downstream end of a location of a non cut-out piece (piece P7 in this example). This advance is performed over a length that is greater than the distances BP9 and BP10 between the upstream end of the working zone and the closest upstream ends of the locations on the material of the pieces P9 and P10 that do not yet lie fully within the working zone, since Inf7 is greater than BP9 and BP10.

During the second advance, and after the end of it, those pieces P6 and P7 whose locations lie within the working zone after the end of the first advance can be cut out (FIG. 5D).

Figure 6:
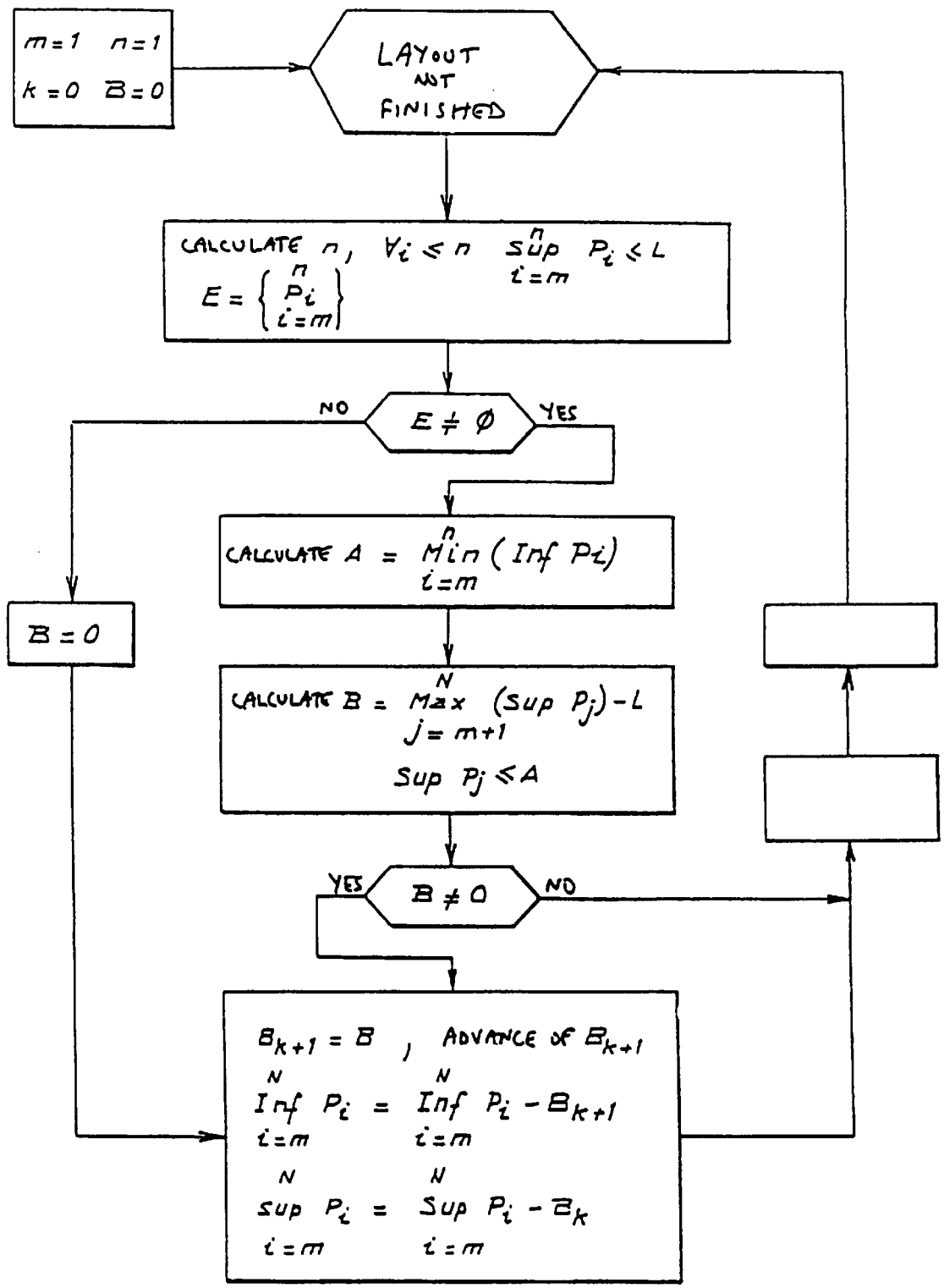
FIG. 6 is a flow chart showing the various stages of the second implementation of the method of the invention.

The process continues in this way until the entire layout has been cut out. An elementary sequence of this process is described by the flow-chart shown in FIG. 6.

Initially, parameters m, n, k and B are set respectively to the values m=1, n=1, k=0, B=0 (stage 200) and, so long as the entire layout has not been cut out (test 201), the set E of pieces $P_i$ in the layout lying within the working zone (stage 202) is determined (where i is an integer that is not less than 1). This involves seeking that value of n for which, regardless of $i \leq n$, $$\operatorname*{Sup}_{i=m}^{n} P_i \leq L$$

where Sup $P_i$ is the abscissa, as measured from an origin O situated at the downstream end of the working zone, of the upstream end of the piece $P_i$ (it is assumed that pieces $P_1$ to $P_{m-1}$, have already been cut out). By way of example, in FIG. 5B, the abscissa Sup $P_5$ is shown for piece $P_5$.

If the set E is not empty (test 203), the minimum distance A between the downstream end of the working zone and the closest downstream end of a non cut-out piece is calculated:

$$A = \operatorname*{Min}_{i=m}^{n} (InfP_i)$$

where Inf $P_i$ is the abscissa of the downstream end of piece $P_i$ (stage 204). The maximum distance B between the upstream end of the working zone and an upstream end of a non cut-out piece that does not yet lie entirely within the working zone is calculated:

$$B = \operatorname*{Max}_{j=n+1}^{N} (SupP_j) - L$$

where $P_j$ is the abscissa of the upstream end of piece $P_j$, and N is the total number of pieces to be cut out (stage 205), with the condition Sup $P_j$–L$\leq$A (so as to prevent the following advance from causing a non cut-out piece to be removed from the working zone). If the value B is zero (test 206), piece $P_m$ is cut out (stage 207), the value of n is incremented by unity (stage 208) and test 201 is started again.

If the value B is not zero (test 206), an advance stage of length $B_{k+1}$=B is commanded, where k is the number of advances made (stage 209), and piece $P_n$ is cut out by going on to stage 207. During the advance, the abscissa of the tool is servo-controlled to the position of the conveyor, and the values Inf $P_i$ and Sup $P_i$ of all of the pieces $P_i$ for which m$\leq$i$\leq$N are corrected so that they read:

$$\operatorname*{InfP_i}_{i=m}^{N} = \operatorname*{InfP_i}_{i=m}^{N} - B_{k+1} \text{ and } \operatorname*{SupP_i}_{i=m}^{N} = \operatorname*{SupP_i}_{i=m}^{N} - B_k$$

where $B_k$ and $B_{k+1}$ are the lengths of the $k^{th}$ and $(k+1)^{th}$ advances.

The above-described cutting-out method may be implemented through one or more superposed layers of material, e.g. a plurality of layers of fabric forming a lay-up. Automatic machines making it possible to cut out pieces from such lay-ups are well known.

It appears from the above that the method of the invention is remarkable in that it enables the tool to work while the material is advancing, thereby increasing productivity without having to make significant changes to the control circuit of the machine in which the method is installed.

In particular, all of the features and safety devices available in existing machines, whether they be plotters or cutters, may be retained, e.g. such as automatic re-starting after an incident.

I claim:

1. A method for plotting or cutting along predetermined paths on material with a tool wherein the tool is displaced by a first control circuit in two directions within a predetermined working zone through which the material is intermittently advanced by a second control circuit from an upstream end of the working zone to a downstream end of the working zone, wherein a working window comprises a length in the direction of the advance of the material, which length is less than the length of the working zone, and wherein the method comprises the steps of:

a. advancing the material for a distance that is less than the length of the working zone as measured in the direction of the advance of the material;

b. controlling the tool while the material is advancing so that the tool travels along at least a part of one or more paths located in a portion of the material which is in the working zone prior to advancing the material and which remains in the working zone after advancing the material;

c. shifting the working window toward the upstream end of the working zone, after at least a portion of the paths lying within the working window have been traveled, so that the working window is positioned to cover at least each path or path portion that has not yet been traveled within the working zone.

2. The method of claim 1, wherein the advancing step further comprises advancing the material while the working window is shifting from the downstream end to the upstream end of the working zone.

3. The method of claim 2, wherein the working window has a length equal to half the length of the working zone.

4. The method of claim 2, wherein the working window has a length that is greater than half the length of the working zone, and each time the material advances, it does so over a distance not more than the difference between the length of the working zone and the length of the working window.

5. The method of claim 1, wherein the advancing step further comprises advancing the material not more than a first distance that is equal to the distance between the downstream end of the working zone and the closest downstream end of a location for a path that has not been traveled by the tool prior to advancing the material.

6. The method of claim 5, wherein the advancing step further comprises advancing the material not less than a second distance that is equal to the largest of the distances between the upstream end of the working zone and the upstream ends of the locations for paths that do not yet lie entirely within the working zone, wherein the second distance is not more than the first distance.

7. A plotting or cutting apparatus for plotting or cutting along predetermined paths on material with a tool wherein the apparatus comprises:

a. a working surface on which the material is disposed and including a predetermined working zone;

b. a first control circuit for co controlling the movement of the tool in two directions within the predetermined working zone;

c. a second control circuit for intermittently advancing the material through the working zone from an upstream end of the working zone to a downstream end of the working zone;

wherein the second control circuit advances the material for a distance that is less than the length of the working zone as measured in the direction of the advance of the material and the first control circuit controls the travel of the tool while the material is advancing so that the tool travels along at least a part of one or more paths located in a portion of the material which is in the working zone prior to advancing the material an d which remains in the working zone after advancing the material and wherein the first control circuit constrains the operation of the tool to a working window having a length in the direction of the advance of the material, which length is less than the length of the working zone and wherein the working window shifts toward the upstream end of the working zone, after at least a portion of the paths lying within the working window have been traveled, so that the working window is positioned to cover at least each path or path portion that has not vet been traveled within the working zone.

8. The apparatus of claim 7, wherein the second control circuit advances the material while working window is shifting from the downstream end to the upstream end of the working zone.

9. The apparatus of claim 8, wherein the working window has a length equal to half the length of the working zone.

10. The apparatus of claim 9, wherein the working window has a length that is greater than half the length of the working zone, and each time the material advances, it does so over a distance not more than the difference between the length of the working zone and the length of the working window.

11. The apparatus of claim 7, wherein the second control circuit advances the material not more than a first distance that is equal to the distance between the downstream end of the working zone and the closest downstream end of a location for a path that has not been traveled by the tool prior to advancing the material.

12. The apparatus of claim 11, wherein the second control circuit advances the material not less than a second distance that is equal to the largest of the distances between the upstream end of the working zone and the upstream ends of the locations for paths that do not yet lie entirely within the working zone, wherein the second distance is not more than the first distance.

\* \* \* \* \*

UNITED STATES PATENT AND TRADEMARK OFFICE
CERTIFICATE OF CORRECTION

PATENT NO. : 5,867,392

DATED : February 2, 1999

INVENTOR(S) : Philippe Bousquet

It is certified that error appears in the above-identified patent and that said Letters Patent is hereby corrected as shown below:

Column 8, Line 61: After the word "material;" add the word —and--

Column 9, Line 7: Delete "2" and replace with —3--

Column 9, Line 30: Delete the word, "co"

Column 10, Line 4: Delete the phrase "an d" and replace with --and--

Column 10, Line 14: Delete the word "vet" and replace with —yet--

Signed and Sealed this

Twenty-first Day of September, 1999

Attest:

Q. TODD DICKINSON

*Attesting Officer*          *Acting Commissioner of Patents and Trademarks*